(12) United States Patent
Griswold et al.

(10) Patent No.: US 7,362,757 B2
(45) Date of Patent: Apr. 22, 2008

(54) OPTIMIZING 802.11 POWER-SAVE FOR IP MULTICAST GROUPS

(75) Inventors: Victor J. Griswold, North Canton, OH (US); Robert Meier, Cuyahoga Falls, OH (US)

(73) Assignee: Cisco Technology, Inc., San Jose, CA (US)

( * ) Notice: Subject to any disclaimer, the term of this patent is extended or adjusted under 35 U.S.C. 154(b) by 789 days.

(21) Appl. No.: 10/723,328

(22) Filed: Nov. 26, 2003

(65) Prior Publication Data

US 2005/0114537 A1 May 26, 2005

(51) Int. Cl.
*H04L 12/28* (2006.01)

(52) U.S. Cl. ........................ 370/390; 370/392
(58) Field of Classification Search ............... None
See application file for complete search history.

(56) References Cited

U.S. PATENT DOCUMENTS

| | | | |
|---|---|---|---|
| 6,002,918 A * | 12/1999 | Heiman et al. | 340/7.38 |
| 6,754,211 B1 * | 6/2004 | Brown | 370/389 |
| 7,082,114 B1 * | 7/2006 | Engwer et al. | 370/331 |
| 2002/0016151 A1 * | 2/2002 | Romans | 455/13.4 |
| 2002/0085506 A1 * | 7/2002 | Hundscheidt et al. | 370/254 |
| 2003/0087653 A1 | 5/2003 | Leung et al. | |
| 2006/0034278 A1 * | 2/2006 | Hundscheidt et al. | 370/390 |

FOREIGN PATENT DOCUMENTS

| | | |
|---|---|---|
| EP | EP-0917380 A2 | 5/1999 |
| WO | 99/59355 | 11/1999 |
| WO | 03/019860 A1 | 3/2003 |

OTHER PUBLICATIONS

Int'l Search Report for International Application No. PCT/US2004/028287, filed on Aug. 31, 2004.

* cited by examiner

*Primary Examiner*—Edan Orgad
*Assistant Examiner*—Jung Park
(74) *Attorney, Agent, or Firm*—Tucker Ellis & West LLP

(57) ABSTRACT

A method for providing a superior quality of service for multicast data streams delivered over a wireless local area network. As Internet Protocol multicast data streams are received by an access point, the access point observes Internet Group Multicast Protocol registration messages to determine which of its associated stations subscribe to each multicast data stream. The access point then determines which of the multicast data streams it receives have only active subscribing stations as opposed to those data streams having at least one associated station operating in power-save mode. The access point will automatically transmit each multicast data stream having only active subscribers immediately to the associated active stations, while buffering the multicast data stream for which there is at least one associated station operating in power-save mode.

33 Claims, 3 Drawing Sheets

US 7,362,757 B2

OPTIMIZING 802.11 POWER-SAVE FOR IP MULTICAST GROUPS

BACKGROUND OF THE INVENTION

The present invention relates generally to wireless broadcast transmissions and more particularly to a method for optimizing the delivery of IP multicast group packets, especially in an 802.11 network.

Unless otherwise defined herein, the terms in this specification should be interpreted as defined, or as customarily used, in the Institute of Electrical and Electronics Engineers (IEEE) 802.11 and 802.11e specifications. The IEEE 802.11 and IEEE 802.11e specifications are hereby incorporated by reference. The current draft standard refers to the current draft supplement to the 802.11e specification, which is hereby incorporated by reference.

An 802.11 Local Area Network (LAN) is based on an architecture wherein the system is divided into a basic unit or cell which is known as the Basic Service Set or BSS. The BSS is controlled by a base station commonly designated as an Access Point ("AP"). In an 802.11 BSS, if a single station enters Power-Save Protocol (PSP) operation, the entire BSS adopts different characteristics to be able to provide services to that one station. Under normal use, this would not present too great a hardship as slight lag and delay times for transmission would not be noticeable for data transfers. However, for transmissions of more urgency, such as multicast, Voice-over-Internet Protocol (VoIP), video, etc., such a lag and delay time becomes noticeable to the user. In a BSS where one of the stations has gone into PSP operation, the BSS-wide characteristics will have changed to provide the PSP station with service. One change made is that all multicasts and broadcasts are queued by the AP to be transmitted as a batch after the AP transmits its next 802.11 beacon containing a Delivery Traffic Indication Map (DTIM). For example, station A and station B are both clients of an 802.11 AP. When station A goes into 802.11 PSP operation, station B remains active. If station B then subscribes to an IP multicast group, the 802.11 AP will buffer the IP multicast stream to compensate for station A being in PSP operation, even though station A is not a subscriber to the IP multicast group.

Internet Group Multicast Protocol (IGMP) was developed to allow stations to request membership into a multicast group or video stream/conference. IGMP is not used by the application for actual voice/video transfer, but rather as a membership mechanism for joining or participating in multicasts. IGMP is itself a session-layer protocol used to establish membership in a multicast group. The method of transport for multicast data will traditionally be RTP. Membership into a multicast group is dynamic, and members can enter and leave the group at any time. A user (host) can be a member of one or more groups simultaneously, and does not need to be a member of a group in order to send datagrams to it. A "host" can be a user or a multicast router.

In accordance with the forgoing, there is a need to allow for the immediate transmission of IP multicast data streams for which there are only active 802.11 subscribers.

There also is a need to make the quality of IP multicast data streams no longer dependent on all stations in a BSS remaining active.

Thus there is a need to offset the delays in transmission as a result of a station entering power-save operation in a BSS for other stations subscribing to IP multicasts.

BRIEF SUMMARY OF THE INVENTION

In accordance with the present invention, there is provided a method for improving the quality of service to wireless stations subscribing to multicast streams.

Further, in accordance with the present invention, there is provided a method for an access point to provide superior quality of service to a plurality of associated stations by automatically optimizing delivery of a plurality of multicast data streams over a network. The access point observes a group membership registration message from at least one associated station. The multicast stream to which this associated station subscribes is then determined. The access point subsequently tracks this multicast data stream for which all associated stations subscribing to the stream support low packet-delivery latency, e.g., active stations. For these associated active stations, the access point will immediately transmit packets belonging to the multicast data stream. For multicast data streams with at least one associated station in power-save protocol operation, the access point will buffer such multicast data streams between delivery traffic indication map beacons until all associated stations subscribing to the stream become active.

In a preferred embodiment, the access point is suitably an 802.11 access point. In a preferred embodiment, the registration of the associated station is accomplished using Internet Group Multicast Protocol. In a preferred embodiment, associated stations subscribing to a multicast stream are distinguished by being either in 802.11 active mode or in 802.11 power-save protocol operation.

Yet further, in accordance with the present invention, in a network comprising at least one access point, a plurality of associated stations and one or more multicast data streams, there is provided a system for providing superior quality of service to the plurality of associated stations by automatically optimizing the delivery of multicast data streams over the network. The system includes means adapted for observing a registration message by an access point from at least one associated station. Having observed such registration messages, the access point then employs means adapted for determining the set of multicast data streams to which each associated station subscribes. The system also comprises means adapted for tracking the multicast data streams for which all associated stations are active. The system further comprises means adapted for transmitting multicast data streams immediately to all active associated stations. The system may also comprise means adapted for comparing a multicast data stream for which all associated stations are active with a multicast data stream for which at least one associated station is in power-save protocol operation.

Still other objects of the present invention will become readily apparent to those skilled in this art from the following description wherein there is shown and described a preferred embodiment of this invention, simply by way of illustration of one of the best modes best suited for to carry out the invention. As it will be realized, the invention is capable of other different embodiments and its several details are capable of modifications in various obvious aspects all without from the invention. Accordingly, the drawing and descriptions will be regarded as illustrative in nature and not as restrictive.

BRIEF DESCRIPTION OF THE SEVERAL VIEWS OF THE DRAWING

The accompanying drawings incorporated in and forming a part of the specification, illustrate several aspects of the present invention, and together with the description serve to explain the principles of the invention. In the drawings.

DETAILED DESCRIPTION OF INVENTION

The present invention is described below as a method invoked upon a wireless computer network. Directed to an access point, the present invention pertains to the automatic and immediate transmission of Internet Protocol multicast data streams. Throughout this description, the preferred embodiment and examples shown should be considered as exemplars, rather than limitations, of the present invention.

Figure 1:
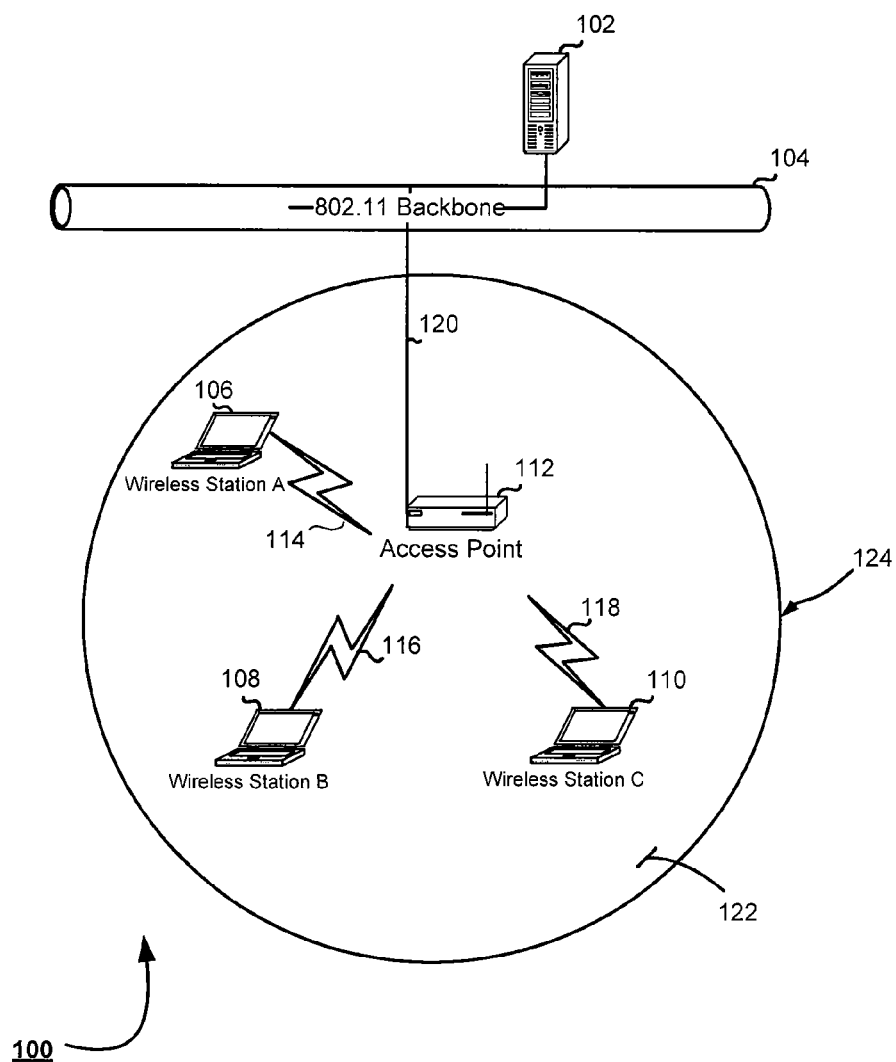
FIG. 1 is a block diagram of a typical 802.11 network.

Referring first to FIG. 1 there is illustrated a block diagram of a typical 802.11 network 100. The network 100 comprises a single access point 112. Wireless stations 106, 108 and 110 are shown as being within Access Point 112's coverage area 124, as well as being members of the Basic Service Set, or "BSS" 122. A backbone 104 is used to connect Access Point 112 and other network services 102, via a physical connection 120. Typically the backbone is a wired network connection, such as Ethernet, however any suitable means, wired or wireless, and any standard networking protocol, may be used. While the aforementioned network 100 shows a single access point and three wireless stations, as those skilled in the art can readily appreciate the network may comprise any number of access points and any number of wireless stations.

Communications channels 114, 116 and 118 are shown depicting the radio signals transmitted between the Access Point 112 and the wireless stations 106, 108 and 110. The relative position of wireless stations 106, 108 and 110 may change with respect to each other and the Access Point 112, but provided the wireless stations 106, 108 and 110 remain within the coverage area 124, they will remain members of the BSS 122. Although the wireless stations 106, 108 and 110 are shown as notebook, or laptop personal computers, it will be appreciated by those skilled in the art that members of a Basic Service Set can include other devices, e.g., desktop computer, PDA, pocket PC, etc., or any device that is equipped to communicate over the 802.11x or similar network.

Figure 2:
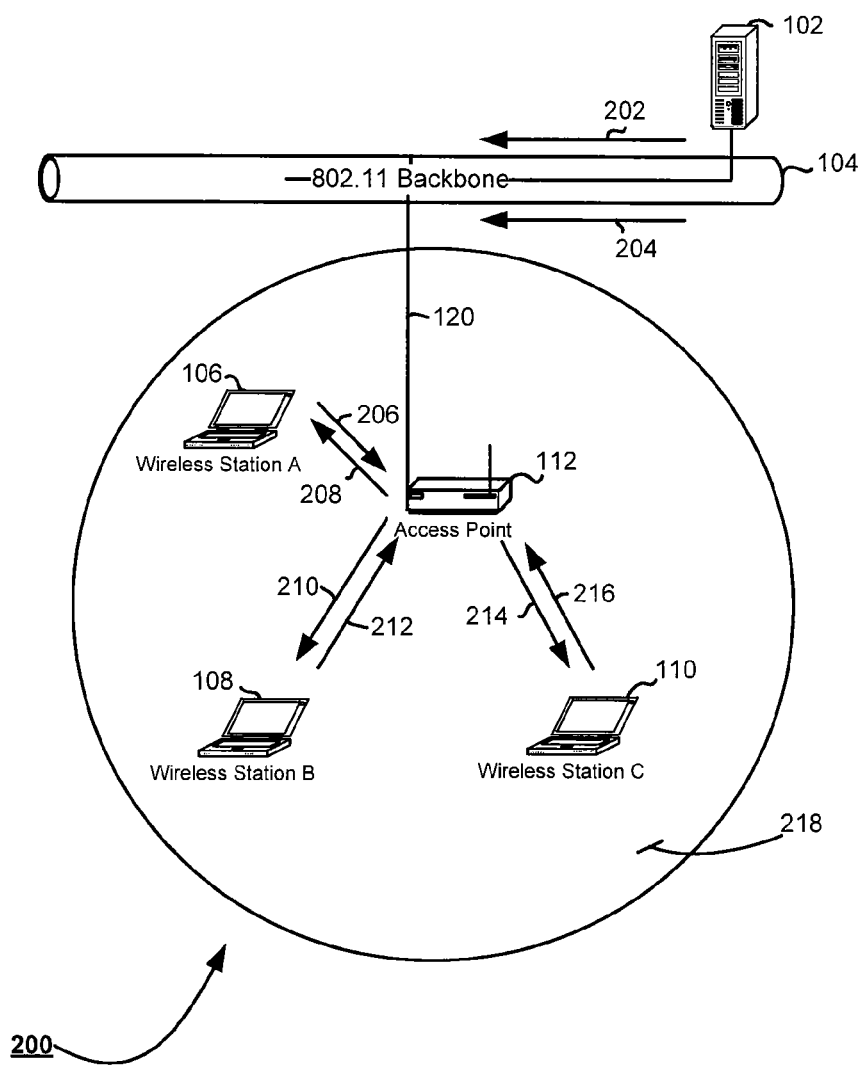
FIG. 2 is a block diagram of an 802.11 network multicast data stream operation.

The function of the present invention may best be explained with reference to FIG. 2, which depicts an 802.11 network 200 in operation. The Basic Service Set 218 contains the Access Point 112, wireless station A 106, wireless station B 108 and wireless station C 110. The Access Point 112 is connected, via connection 120, to the 802.11 backbone 104.

A first IP multicast stream ("IPMCS1") 202 and a second IP multicast stream ("IPMCS2") 204 are being received by the 802.11 network 200 from a remote location. It will be noted and appreciated by one of ordinary skill in the art that the location of the sender(s) of the multicast streams is not particularly relevant to the present invention and the subject invention will function as well with a local sender as it would with an extremely distant sender. For purposes of explanation, wireless station A 106 subscribes to IPMCS1 202 and is in active mode. Access Point 112 receives the IPMCS1 202 and transmits the IP multicast 202 via multicast communications channel 208 as soon as incoming packets are received. Turning now to wireless station B, it is shown that station B is an IPMCS2 204 subscriber, but is currently operating in power-save mode. Station C is also a subscriber to IPMCS2 204, but is active.

In accordance with earlier solutions, since at least one station (station B) is in power-save mode, the Access Point 112 batches and queues all incoming multicast and broadcast packets until the next DTIM beacon is sent to all stations in the BSS 218. In contrast, the subject invention allows Station A to receive all incoming IP multicast stream packets for IPMCS1 202 immediately upon receipt by the Access Point 112, without the Access Point 112 having to batch and queue IPMCS1 202. The Access Point 112, in accordance with the 802.11 power-save protocol, still batches and queues IPMCS2 204 data packets. As a result, no delay is accorded to Station A, while Station C, a subscriber to IPMCS2 204, must wait until the next DTIM beacon to receive the IP multicast stream to which it subscribes.

Furthermore, following the preceding example, Station A subscribes to IPMCS1 and Station C subscribes to IPMCS2, however Station B subscribes to neither IP multicast stream. Both Stations A and C are in active mode and Station B is operating in power-save mode. In accordance with the prior art, both IPMCS1 and IPMCS2 will be batched and queued to be sent following the next DTIM beacon from the Access Point 112. It will be appreciated by those skilled in the art that in practicing the present invention, neither IPMCS1 or IPMCS2 need be batched and queued if Station B is not a subscriber to either. That is, Station A and Station C will receive immediate transmissions of packets by the Access Point 112. Since Station B does not subscribe to IPMCS2, as it did in the preceding example, transmission of IPMCS2 packets to Station C will not have to be delayed.

To accomplish the foregoing, the Access Point 112 observes the IGMP group join requests transmitted from all the Access Point's 112 associated stations. The observation indicates to the Access Point 112 that Station A is operating in active mode, and subscribing to IPMCS1 202. No other associated stations are subscribing to IPMCS1 202, thereby indicating to the Access Point 112 that all IPMCS1 202 subscribers are operating in active mode. The Access Point 112 may then immediately transmit all incoming IPMCS1 202 packets to the subscribing stations, in this case, Station A. The Access Point 112 observes that Station C sends an IGMP group join request to subscribe to IPMCS2 204. The Access Point also observes that Station B also subscribes to IPMCS2 204. This indicates to the Access Point 112 to batch and queue all incoming IPMCS2 204 packets until it transmits the next DTIM beacon, awakening Station B from power-save operation.

To accomplish the actions contained above in the second example, the Access Point 112 observes the IGMP group join requests from all associated stations. This observation indicates that Station A has sent an IGMP request to join the IPMCS1, Station B has made no requests and Station C has sent an IGMP request to join IPMCS2. Tracking the IP multicast streams, the Access Point 112 determines that in its BSS, Station A is the only subscriber to IPMCS1 and is active, Station C is the only subscriber to IPMCS2 and is active and Station B is subscribed to neither IPMCS1 or IPMCS2. The Access Point 112 then immediately forwards the incoming IP multicast packets to the corresponding subscribing station.

It will be appreciated by those skilled in the art that the observations performed by Access Point 112 is per Virtual Local Area Network ("VLAN"), if all IP multicast traffic is forwarded on a per-VLAN basis. The preceding holds true even if this means the duplication of the data stream for different VLANs. It will also be appreciated that the subject invention may be practiced even if all IP multicast traffic is forwarded independent of VLAN, if the IP multicast traffic is isolated to a single VLAN—independent broadcast domain.

Figure 3:
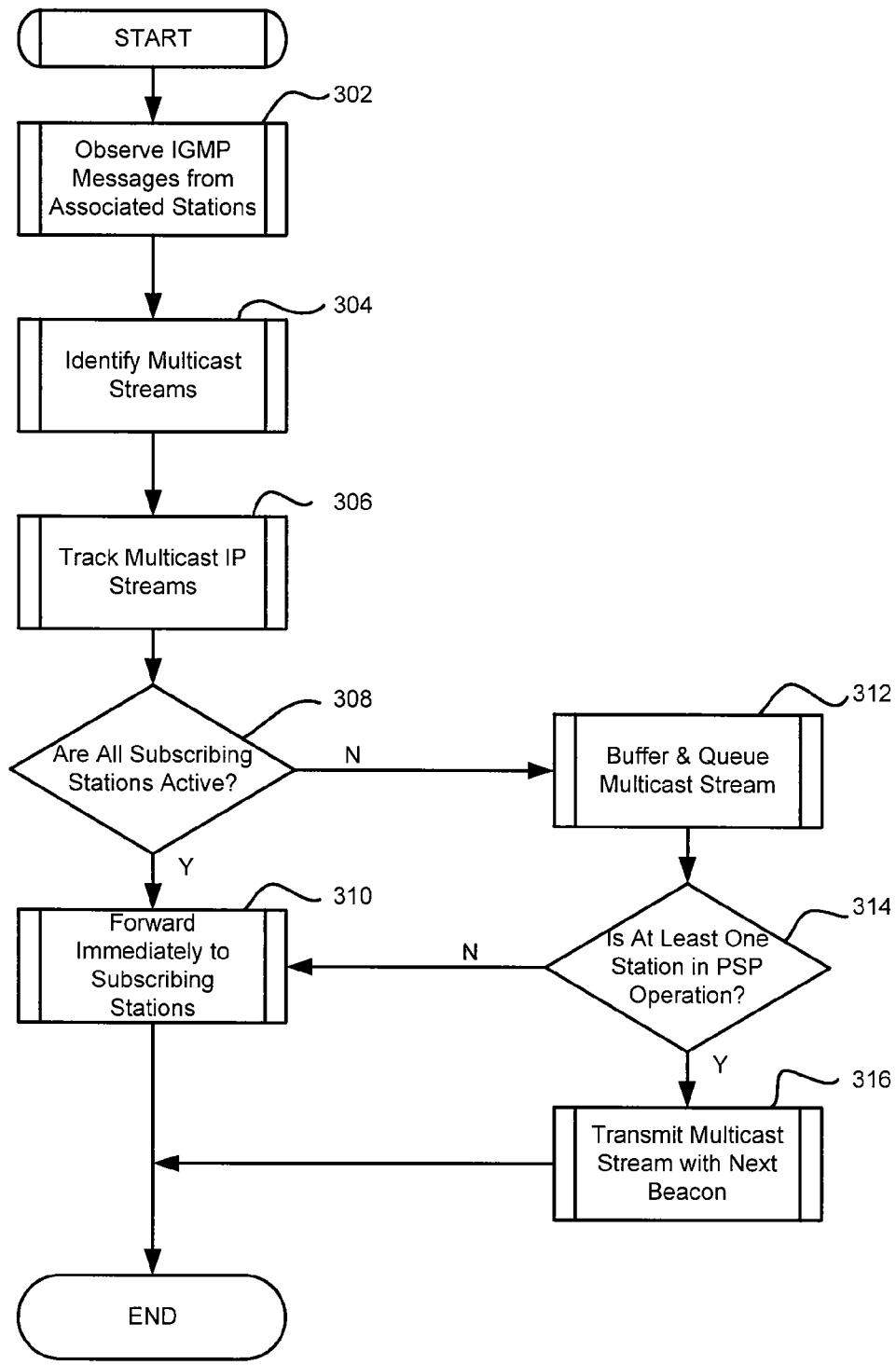
FIG. 3 is a flow chart illustrating the present invention in operation on an 802.11 network.

Turning now to FIG. 3, there is shown a flow chart depicting the operation of Access Point 112 in accordance with the subject invention. The Access Point 112 begins at 302 by observing IGMP messages originating from its associated stations. IGMP messages do not contain data, but rather merely transmit requests to join a multicast group. The Access Point 112 then identifies all multicast streams to which its associated stations subscribe at 304. This identification allows the Access Point 112 to track the multicast streams at 306 for which its associated stations subscribe, in essence monitoring the streams. The Access Point then determines whether all the stations subscribing to a particular multicast stream are active at step 308. A positive determination in 308 directs the Access Point 112 to immediately forward all packets received for the particular multicast stream to the corresponding active and subscribing stations at step 310.

In the event that the Access Point determines in step 308 that not all of the subscribing stations are active, the Access Point 112 batches and queues the multicast stream at step 312 for which not all of the subscribing stations are active. The Access Point then determines at 314 if at least one subscribing station is in power-save operation. If no subscribing station is in power-save operation at step 314, the Access Point proceeds to step 310 and immediately forwards the packets to the subscribing stations corresponding to the multicast stream for which packets have been received. If at step 314, the Access Point 112 determines that at least one subscribing station has entered power-save operation, the Access Point will at step 316 wait to transmit the packets received until the next DTIM beacon.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of the ordinary skill in the art to utilize the invention in various embodiments and with various modifications as are suited to the particular use contemplated. All such modifications and variations are within the scope of the invention as determined by the appended claims when interpreted in accordance to the breadth to which they are fairly, legally and equitably entitled.

What is claimed is:

1. A method for an access point to provide superior quality of service to a plurality of associated stations by automatically optimizing delivery of a plurality of multicast data streams over a network, the steps comprising:
   observing, at an access point, a registration message that originated from at least one associated station;
   determining, from the registration message, a multicast data stream to which this associated station subscribes;
   tracking the multicast data stream for which all associated stations subscribing to the steam support low packet-delivery latency;
   comparing the multicast data stream for which all associated stations subscribing to the stream support low packet-delivery latency with a multicast data stream for which at least one associated station subscribing to the stream supports only high packet-delivery latency; and
   transmitting the multicast data stream immediately to all associated low-latency stations.

2. The method of claim 1 wherein the access point is an 802.11 access point.

3. The method of claim 1 wherein the registration is accomplished using Internet Group Multicast Protocol.

4. The method of claim 1 wherein each low-latency associated station is in 802.11 active operation.

5. The method of claim 1, wherein each high-latency associated station is in 802.11 power-save protocol operation.

6. The method of claim 5, further comprising the step of buffering the multicast data stream for which the at least one associated station is in power-save protocol operation.

7. The method of claim 1, wherein the multicast data stream is transmitted to a plurality of stations operating on the same virtual local area network.

8. The method of claim 1, wherein the multicast data stream is transmitted to a plurality of stations operating on a plurality of virtual local area networks.

9. The method of claim 1, wherein the immediately transmitting step is applied at the Internet Protocol level.

10. The method of claim 1, wherein the associated station is a portable personal computer.

11. The method of claim 1, wherein the associated station is a personal data assistant.

12. In a network comprising at least one access point, a plurality of associated stations and a plurality of multicast data streams, a system for enhancing quality of service to the plurality of associated stations by automatically optimizing delivery of the multicast data streams over the network, comprising:
   means adapted for observing, at an access point, a registration message that originated from at least one associated station;
   means adapted for determining a multicast data stream to which this associated station subscribes;
   means adapted for tracking the multicast data stream for which all associated stations subscribing to the steam support low packet-delivery latency;
   means adapted for comparing the multicast data stream for which all associated stations subscribing to the stream support low packet-delivery latency with a multicast data stream for which at least one associated station subscribing to the stream supports only high packet-delivery latency; and
   means adapted for transmitting the multicast data stream immediately to all the associated low-latency stations.

13. The system of claim 12 wherein the access point is an 802.11 access point.

14. The system of claim 12 wherein the registration is accomplished using Internet Group Multicast Protocol.

15. The system of claim 12 wherein each low-latency associated station is in 802.11 active operation.

16. The system of claim 12, wherein each high-latency associated station is in 802.11 power-save protocol operation.

17. The system of claim 16, the further comprising means adapted for buffering a multicast data stream for which at least one associated station subscribing to the stream supports only high packet-delivery latency.

18. The system of claim 12, wherein the multicast data stream is transmitted to a plurality of stations operating on the same virtual local area network.

19. The system of claim 12, wherein the multicast data stream is transmitted to a plurality of stations operating on a plurality of virtual local area networks.

20. The system of claim 12, wherein the means adapted for immediately transmitting is applied at the Internet Protocol level.

21. The system of claim 12, wherein the associated station is a portable personal computer.

22. The system of claim 12, wherein the associated station is a personal data assistant.

23. A computer program product having a computer readable medium having computer program logic recorded thereon for performing a method for an access point to provide superior quality of service to a plurality of associated stations by automatically optimizing delivery of a plurality of multicast data streams over a network, the steps comprising:

observing, at an access point, a registration message that originated from at least one associated station;

determining a multicast data stream to which the this associated station subscribes;

tracking the multicast data stream for which all associated stations subscribing to the steam support low packet-delivery latency;

comparing the multicast data stream for which all associated stations subscribing to the stream support low packet delivery latency with a multicast data stream for which at least one associated station subscribing to the stream supports only high packet-delivery latency; and transmitting the multicast data stream immediately to all associated low-latency stations.

24. The method of claim 23 wherein the access point is an 802.11 access point.

25. The method of claim 23 wherein the registration is accomplished using Internet Group Multicast Protocol.

26. The system of claim 23 wherein each low-latency associated station is in 802.11 active operation.

27. The method of claim 23, wherein each high-latency associated station is in 802.11 power-save protocol operation.

28. The system of claim 27, the further comprising means adapted for buffering a multicast data stream for which at least one associated station subscribing to the stream supports only high packet-delivery latency.

29. The method of claim 23, wherein the multicast data stream is transmitted to a plurality of stations operating on the same virtual local area network.

30. The method of claim 23, wherein the multicast data stream is transmitted to a plurality of stations operating on a plurality of virtual local area networks.

31. The method of claim 23, wherein the immediately transmitting step is applied at the Internet Protocol level.

32. The method of claim 23, wherein the associated station is a portable personal computer.

33. The method of claim 23, wherein the associated station is a personal data assistant.

* * * * *